United States Patent
Kim et al.

(10) Patent No.: US 9,686,523 B2
(45) Date of Patent: Jun. 20, 2017

(54) METHOD FOR IMAGE PROCESSING AND AN ELECTRONIC DEVICE THEREOF

(71) Applicant: Samsung Electronics Co., Ltd., Suwon-si, Gyeonggi-do (KR)

(72) Inventors: Moon-Soo Kim, Seoul (KR); Hong-Suk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 14/189,353

(22) Filed: Feb. 25, 2014

(65) Prior Publication Data

US 2014/0240534 A1     Aug. 28, 2014

(30) Foreign Application Priority Data

Feb. 26, 2013  (KR) .................. 10-2013-0020340

(51) Int. Cl.
| | | |
|---|---|---|
| *H04N 9/73* | (2006.01) | |
| *H04N 5/225* | (2006.01) | |
| *H04N 5/232* | (2006.01) | |

(52) U.S. Cl.
CPC ........... *H04N 9/735* (2013.01); *H04N 5/2258* (2013.01); *H04N 5/23206* (2013.01); *H04N 5/23216* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 2003/0235333 | A1* | 12/2003 | Lin ....................... | H04N 9/735 382/167 |
| 2008/0231726 | A1* | 9/2008 | John ..................... | H04N 9/735 348/223.1 |
| 2009/0324135 | A1* | 12/2009 | Kondo .................. | G06T 3/4038 382/284 |

FOREIGN PATENT DOCUMENTS

| | | | |
|---|---|---|---|
| JP | 03003497 A | * | 1/1991 |
| KR | 100171836 B1 | | 10/1998 |

* cited by examiner

*Primary Examiner* — Roberto Velez
*Assistant Examiner* — Yih-Sien Kao
(74) *Attorney, Agent, or Firm* — Jefferson IP Law, LLP (57) ABSTRACT

A method and an apparatus for image processing in an electronic device are provided. The method for image processing in the electronic device includes obtaining a first image and a second image respectively from a first image sensor and a second image sensor, determining at least one of a first image processing parameter for the first image and a second image processing parameter for the second image as an image processing parameter for the first image and the second image, and displaying at least one of the first image and the second image by considering the image processing parameter for the first image and a second image.

10 Claims, 10 Drawing Sheets

METHOD FOR IMAGE PROCESSING AND AN ELECTRONIC DEVICE THEREOF

CROSS-REFERENCE TO RELATED APPLICATION(S)

This application claims the benefit under 35 U.S.C. §119(a) of a Korean patent application filed on Feb. 26, 2013 in the Korean Intellectual Property Office and assigned Serial number 10-2013-0020340, the entire disclosure of which is hereby incorporated by reference.

TECHNICAL FIELD

The present disclosure relates to a method and apparatus for performing an Automatic White Balance (AWB) in an electronic device.

BACKGROUND

A mobile electronic device may capture a mega pixel or higher resolution image by providing a digital camera function, and may display the captured image by using a high definition screen. If a plurality of image sensors are provided for the digital camera function, a three dimensional image or a panoramic function may also be provided.

Currently, a camera is provided, generally, in a front side and/or a rear side of a mobile electronic device. In this case, a camera placed in the front side is generally used when a user captures a user's own image (e.g., a user's face), and a camera placed in the rear side is generally used when the user captures a foreground image. In addition, the mobile electronic device may display an image obtained from at least one of the camera placed in the front side of the mobile electronic device and the camera placed in the rear side of the mobile electronic device.

As described above, if the image is obtained in the mobile electronic device from the camera, the mobile electronic device uses color information to perform an Auto White Balance (AWB) for removing an influence of a light source from a color of an object in an Image Signal Processor (ISP). In this case, since the camera placed in the rear side of the mobile electronic device is generally directed towards a foreground, color elements for performing the AWB are widely distributed. However, the camera placed in the front side of the mobile electronic device is generally used to capture a user's own face, and thus photographed image obtained from the camera placed in the front side of the mobile device does not include widely distributed color elements for performing the AWB, which may cause an error when the electronic device performs the AWB for the photographed image.

Accordingly there is a need for a method and apparatus for determining an AWB by considering a specific main color ratio among AWBs for different cameras in an electronic device having dual cameras. Herein, the specific main color ratio implies a ratio occupied by one specific color in the image obtained from an image sensor of the camera.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for image processing in an electronic device.

Another aspect of the present disclosure is to provide a method and apparatus for performing an Automatic White Balance (AWB).

Another aspect of the present disclosure is to provide a method and apparatus for sharing an AWB for different cameras in an electronic device having dual cameras.

Another aspect of the present disclosure is to provide a method and apparatus for determining an AWB by considering a monochrome ratio among AWBs for different cameras in an electronic device having dual cameras.

In accordance with an aspect of the present disclosure, a method for image processing is provided. The method includes obtaining a first image and a second image respectively from a first image sensor and a second image sensor, determining at least one of a first image processing parameter for the first image and a second image processing parameter for the second image as an image processing parameter for the first image and the second image, and displaying at least one of the first image and the second image by considering the image processing parameter for the first image and the second image.

In accordance with another aspect of the present disclosure, a method for image processing is provided. The method includes obtaining three or more images from three or more image sensors, determining one of image processing parameters for the respective three or more images as an image processing parameter for the three or more images, and displaying at least one of the three or more images by considering the image processing parameter for the three or more images.

In accordance with another aspect of the present disclosure an electronic device is provided. The electronic device includes at least one processor, at least one memory, a display, and at least one program stored in the memory and configured to be executable by the at least one processor, wherein the processor obtains a first image and a second image respectively from a first image sensor and a second image sensor, determines at least one of a first image processing parameter for the first image and a second image processing parameter for the second image as an image processing parameter for the first image and the second image, and displays at least one of the first image and the second image in the display by considering the image processing parameter for the first image and the second image.

In accordance with another aspect of the present disclosure, an electronic device is provided. The electronic device includes at least one processor, at least one memory, a display, and at least one program stored in the memory and configured to be executable by the at least one processor, wherein upon execution of the at least one program, the processor obtains three or more images from three or more image sensors, determines one of image processing parameters for the respective three or more images as an image processing parameter for the three or more images, and displays at least one of the three or more images by considering the image processing parameter for the three or more images.

In accordance with another aspect of the present disclosure, an electronic device is provided. The electronic device includes at least one memory, and at least one program for executing on an image processing module, wherein the image processing module obtains a first image and a second image respectively from a first image sensor and a second image sensor, determines at least one of a first image processing parameter for the first image and a second image processing parameter for the second image as an image processing parameter for the first image and the second image, and displays at least one of the first image and the second image by considering the image processing parameter for the first image and the second image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a technique for performing an Auto White Balance (AWB) for an image in an electronic device from dual cameras.

In the following description, the electronic device may include a mobile communication terminal having dual cameras, a Personal Digital Assistant (PDA), a Personal Computer (PC), a laptop, a smart phone, a netbook, a TeleVision (TV), a Mobile Internet Device (MID), a Ultra Mobile Personal Computer (UMPC), a tablet PC, a navigator, a smart TV, a digital camera, a Motion Picture Experts Group Layer 3 (MP3) player, etc.

Figure 1:
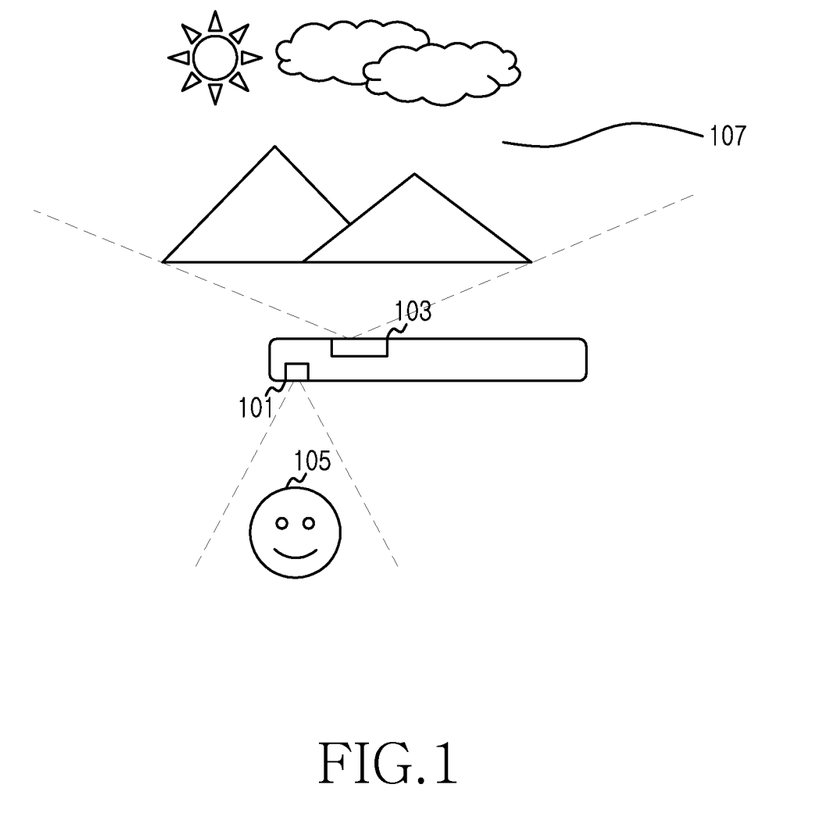
FIG. 1 and FIG. 2 illustrate an example of displaying a preview of an image obtained from dual cameras in an electronic device according to an embodiment of the present disclosure.
Figure 2:
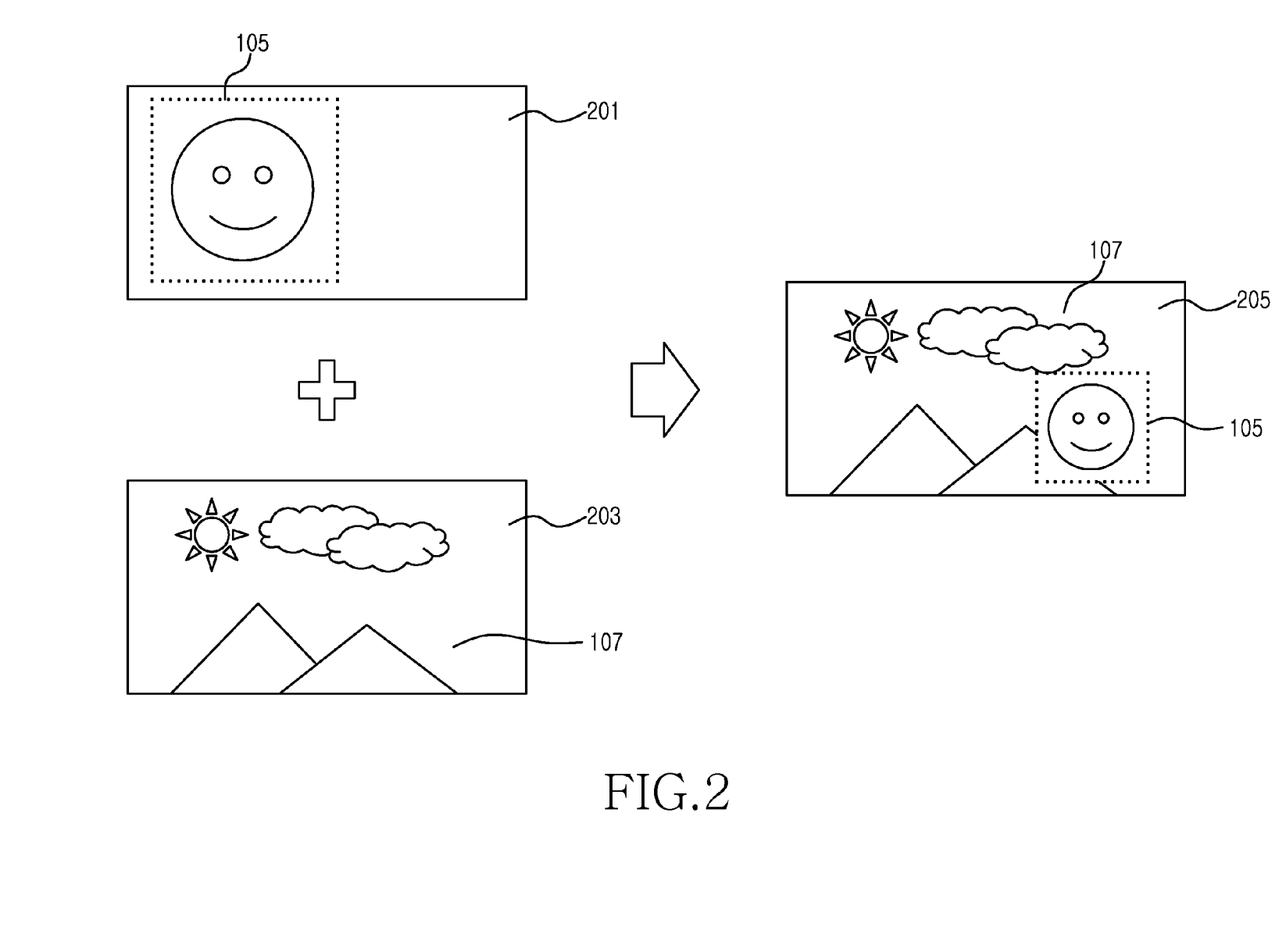

FIG. 1 and FIG. 2 illustrate an example of displaying a preview of an image obtained from dual cameras in an electronic device according to an embodiment of the present disclosure.

Referring to FIG. 1 and FIG. 2, a first camera 101 is a camera located in a front side of the electronic device, and a second camera 103 is a camera located in a rear side of the electronic device.

When a user executes a camera application program, the electronic device may obtain a first subject 105 or a second subject 107 as an image from the first camera 101 or the second camera 103. The electronic device may display a first preview 201 including the first subject 105, a second preview 203 including the second subject 107, and a third preview 205 including the first subject 105 and the second subject 107.

When the preview is displayed, the electronic device performs an AWB by considering color information in each image. In this case, since an image of the first subject 105 is obtained from the first camera 101 located in the front side of the electronic device, a user's face generally occupies a greater portion of the image. Therefore, if the AWB is performed on the image of the first subject 105, there is a lower possibility that the electronic device properly performs the AWB, since color information may be insufficient. On the other hand, since an image of the second subject 107 is obtained from the second camera 103 located in the rear side of the electronic device, a variety of color information is uniformly distributed in general in a greater portion of an image such as a foreground. Therefore, if the AWB is performed on the second subject 107, there may be a higher possibility that the electronic device properly performs the AWB.

If an image of a subject which exists in the closet distance to the electronic device may be obtained as described above, the electronic device may not properly perform the AWB. Therefore, a technique capable of applying an AWB value on an image having a wide color information distribution from dual cameras included in the electronic device will be described below.

Figure 3A:
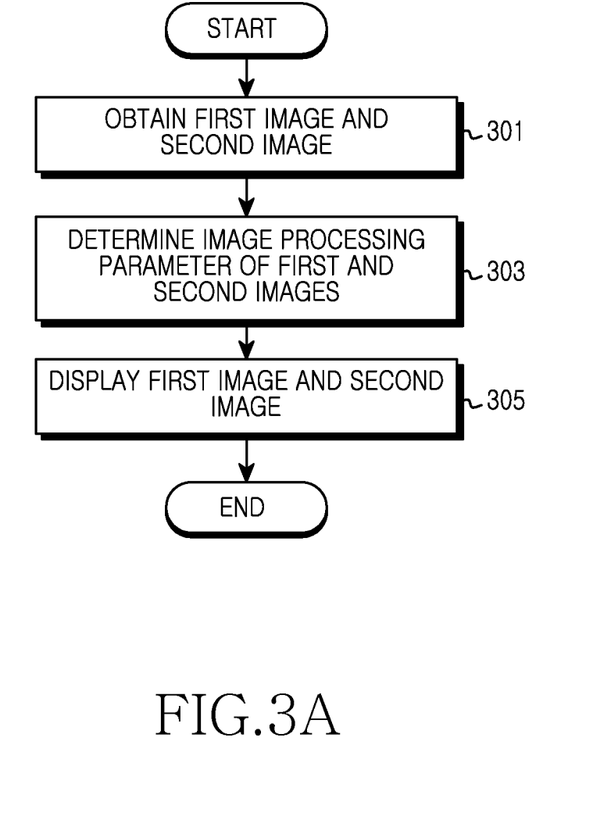
FIG. 3A illustrates a procedure of processing an image in an electronic device according to an embodiment of the present disclosure.

FIG. 3A illustrates a procedure of processing an image in an electronic device according to an embodiment of the present disclosure.

Referring to FIG. 3A, the electronic device obtains a first image and a second image from a first image sensor and a second image sensor in operation 301. For example, as illustrated in FIG. 1, the portrait image 105 including the face of the user of the electronic device may be obtained from the first camera 101 located in the front side of the electronic device, and the foreground image 107 may be obtained from the second camera 103 located in the rear side of the electronic device.

After obtaining the first image and the second image, the electronic device determines an image processing parameter of the first and second images in operation 303. Herein, the image processing parameter may include at least one of an AWB value, an Auto Exposure (AE) value, an interpolation value, a color correction value, a gamma correction value, a color space conversion value, and an edge enhancement value.

After determining the image processing parameter, the electronic device displays the first image and the second image in operation 305. For example, as illustrated in FIG. 2, the electronic device may display the preview 205 of the first and second images to which the image processing parameter of the first image is applied. For another example, the electronic device may display the preview 205 of the first and second images to which the image processing parameter of the second image is applied.

The procedure of FIG. 3A ends.

Figure 3B:
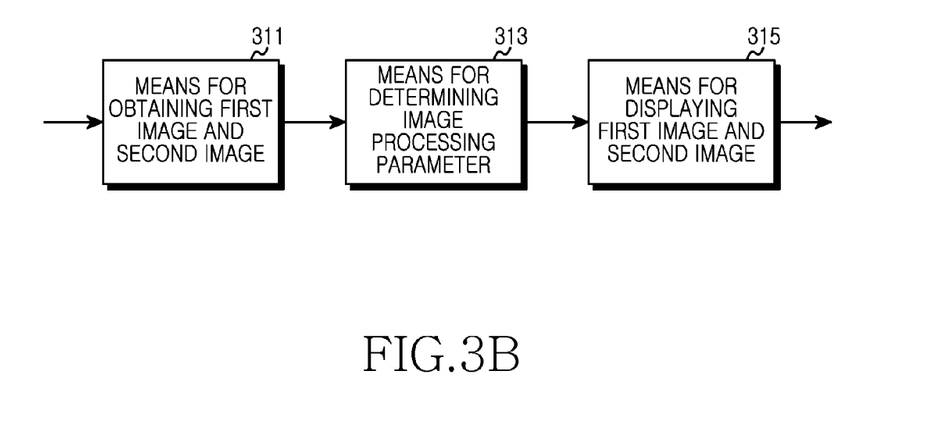
FIG. 3B illustrates an apparatus for processing an image according to an embodiment of the present disclosure.

As described above, each of the steps for processing the image in the electronic device may be performed from a means for image processing as illustrated in FIG. 3B.

FIG. 3B illustrates an apparatus for processing an image according to an embodiment of the present disclosure.

Referring to FIG. 3B, the electronic device includes a first means 311 for obtaining a first image and a second image, a second means 313 for determining an image processing parameter, and a third means 315 for displaying the first image and the second image.

The first means 311 obtains the first image and the second image from a first image sensor and a second image sensor. For example, as illustrated in FIG. 1, the portrait image 105 including the face of the user of the electronic device may be obtained from the first camera 101 located in the front side of the electronic device, and the foreground image 107 may be obtained from the second camera 103 located in the rear side of the electronic device.

The second means 313 determines an image processing parameter of the first and second images. Herein, the image processing parameter may include at least one of an AWB value, an AE value, an interpolation value, a color correction value, a gamma correction value, a color space conversion value, and an edge enhancement value.

The third means 315 displays the first image and the second image. For example, as illustrated in FIG. 2, the electronic device displays the preview 205 of the first and second images to which the image processing parameter of the first image is applied. For another example, the electronic device may display the preview 205 of the first and second images to which the image processing parameter of the second image is applied.

As described above, the electronic device includes respective means for image processing. In this case, the respective means for image processing of the electronic device may be constructed as one means.

Figure 4:
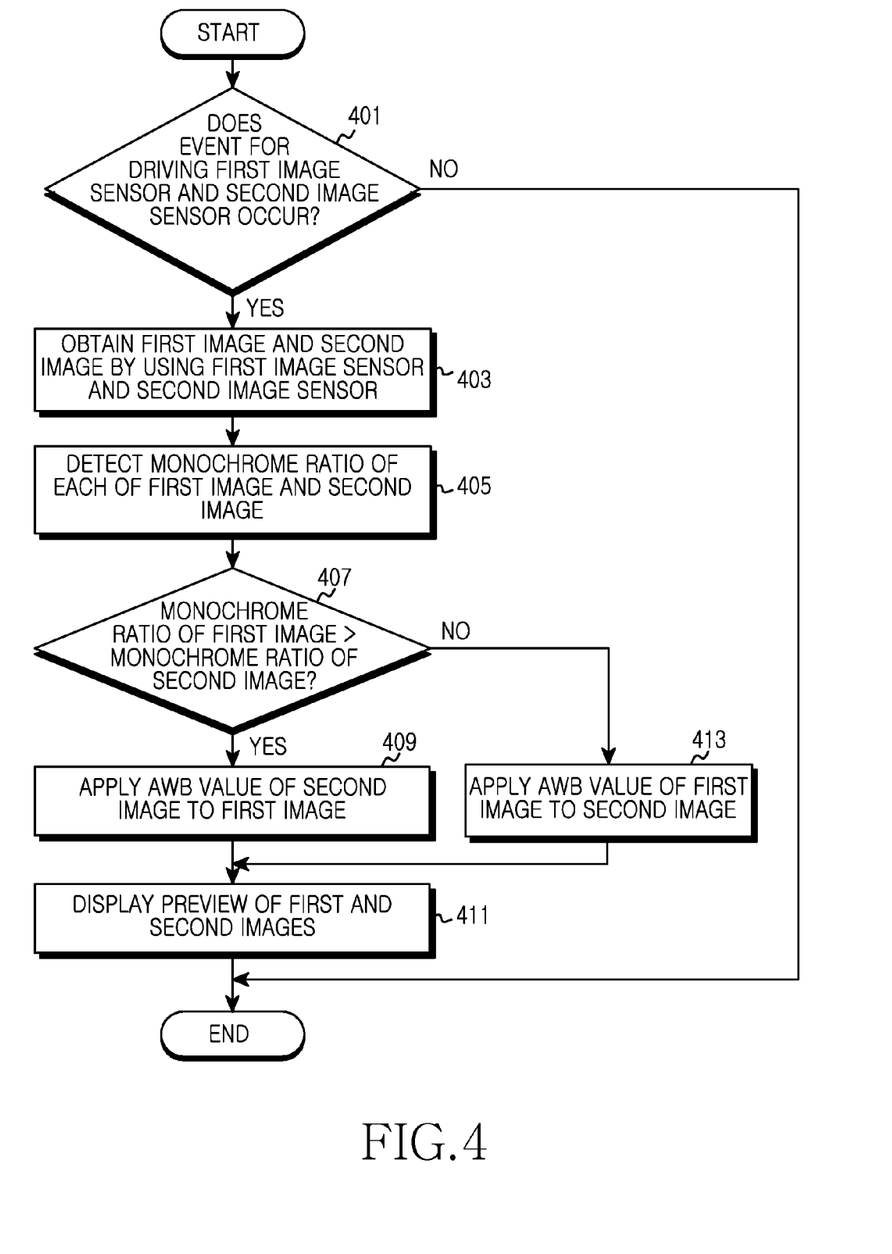
FIG. 4 illustrates a procedure of performing an Auto White Balance (AWB) for an image in an electronic device according to a first embodiment of the present disclosure.

FIG. 4 illustrates a procedure of performing an AWB for an image in an electronic device according to a first embodiment of the present disclosure.

Referring to FIG. 4, the electronic device determines whether an event for driving a first image sensor and a second image sensor occurs in operation 401. For example, as illustrated in FIG. 1, it may be determined whether the first camera 101 located in the front side of the electronic device and the second camera 103 located in the rear side thereof are driven.

If the first image sensor and the second image sensor are driven, the electronic device obtains a first image and a second image from the first image sensor and the second image sensor in operation 403. For example, as illustrated in FIG. 1, the portrait image 105 including the face of the user of the electronic device may be obtained from the first camera 101 located in the front side of the electronic device, and the foreground image 107 may be obtained from the second camera 103 located in the rear side of the electronic device.

Meanwhile, at operation 401, if the first image sensor and the second image sensor are not driven, the electronic device ends processing of the procedure.

After obtaining the first image and the second image, the electronic device detects a specific main color ratio of each of the first image and the second image in operation 405. For example, as illustrated in FIG. 2, the electronic device detects each specific main color ratio from the portrait image 201 and the foreground image 203 including the face of the user of the electronic device. Herein, the specific main color ratio implies a ratio occupied by one specific color in the image obtained from the image sensor.

After detecting the monochrome ratio, the electronic device compares a monochrome ratio of the first image and a monochrome ratio of the second image in operation 407. If the monochrome ratio of the first image is lower than the monochrome ratio of the second image, the electronic device applies an AWB value of the first image to the second image in operation 413.

Meanwhile, if the monochrome ratio of the first image is greater than the monochrome ratio of the second image, the electronic device applies an AWB value of the second image to the first image in operation 409.

The electronic device displays a preview of the first and second images in operation 411. For example, as illustrated in FIG. 2, the electronic device displays the preview 205 of the first and second images to which the AWB value of the first image is applied. For another example, the electronic device may display the preview 205 of the first and second images to which the AWB value of the second image is applied.

In addition, if a monochrome ratio of the first and second images is lower than a reference monochrome ratio, the electronic device may apply an AWB value by considering each image. In this case, the electronic device may display a preview of the first image to which the AWB value of the first image is applied and the second image to which the AWB value of the second image is applied.

The procedure of FIG. 4 ends.

Figure 5:
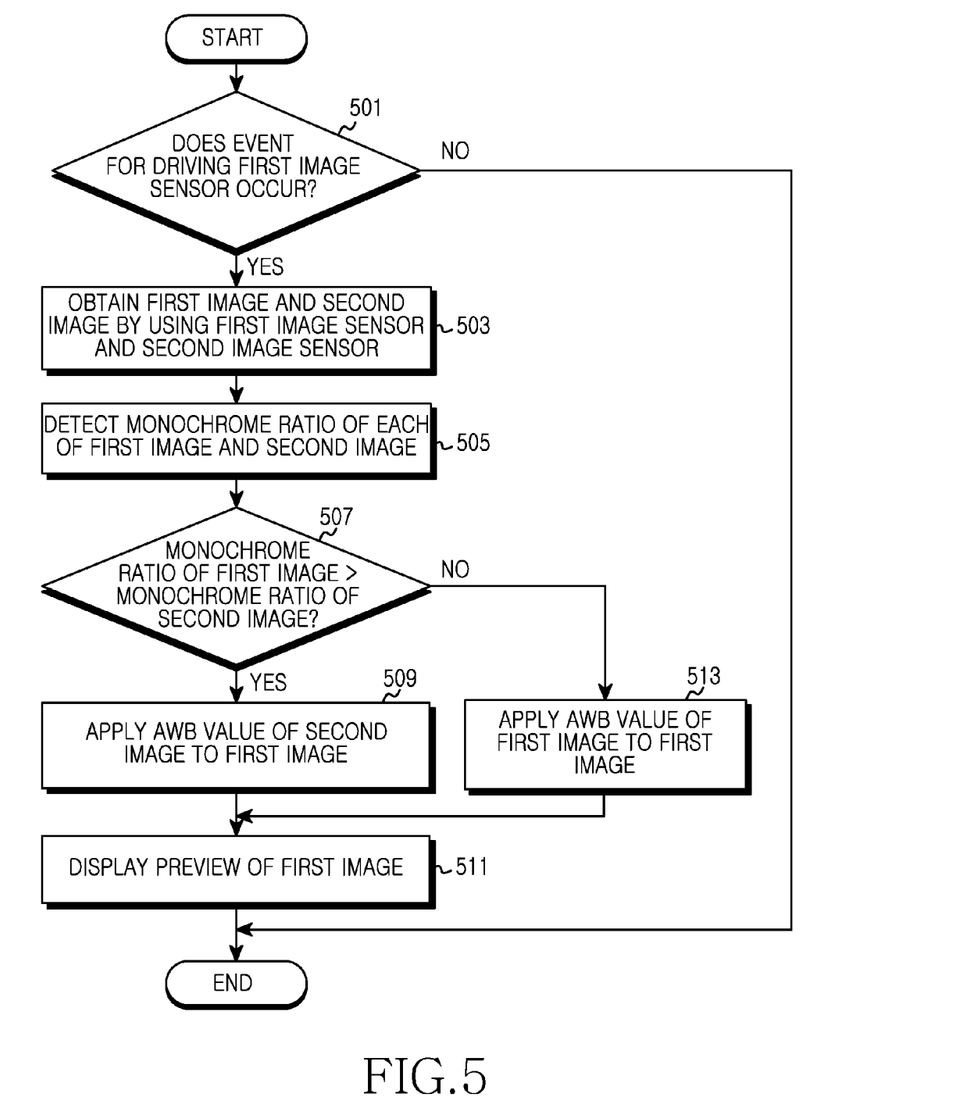
FIG. 5 illustrates a procedure of performing an AWB for an image in an electronic device according to a second embodiment of the present disclosure.
Figure 6:
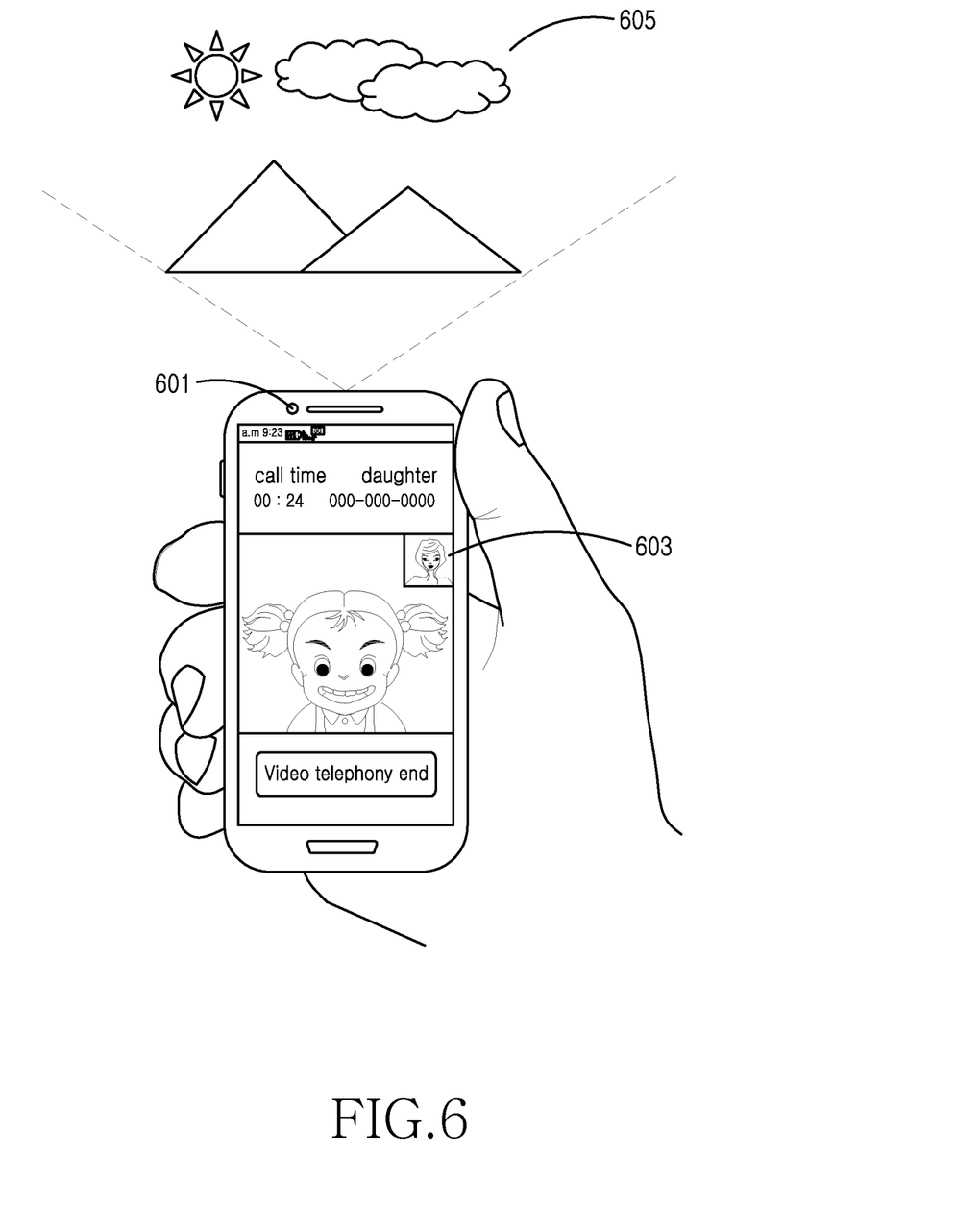
FIG. 6 illustrates an example of performing an AWB for an image in an electronic device according to an embodiment of the present disclosure.

FIG. 5 illustrates a procedure of performing an AWB for an image in an electronic device according to a second embodiment of the present disclosure. FIG. 6 illustrates an example of performing an AWB for an image in an electronic device according to an embodiment of the present disclosure.

Referring to FIG. 5, the electronic device determines whether an event for driving a first image sensor occurs in operation 501. For example, as illustrated in FIG. 6, it may be determined whether a video telephony service which uses a first camera 601 located in a front side of the electronic device is currently being performed.

If the first image sensor is driven, the electronic device obtains a first image and a second image from the first image sensor and the second image sensor in operation 503. For example, as illustrated in FIG. 6, a portrait image 603 including a face of a user of the electronic device may be obtained from the first camera 601 located in the front side of the electronic device, and a foreground image 605 is obtained from a second camera located in a rear side of the electronic device.

Meanwhile, at operation 501, if the first image sensor is not driven, the electronic device ends processing of the procedure.

After obtaining the first image and the second image, the electronic device detects a monochrome ratio of each of the first image and the second image in operation 505. For example, as illustrated in FIG. 6, the electronic device may detect each monochrome ratio from the portrait image 603 and the foreground image 605 including the face of the user of the electronic device. Herein, the monochrome ratio implies a ratio occupied by one color in the image obtained from the image sensor.

After detecting the monochrome ratio, the electronic device compares a monochrome ratio of the first image and a monochrome ratio of the second image in operation 507. If the monochrome ratio of the first image is lower than the monochrome ratio of the second image, the electronic device applies an AWB value of the first image to the first image in operation 513.

Meanwhile, if the monochrome ratio of the first image is greater than the monochrome ratio of the second image, the electronic device applies an AWB value of the second image to the first image in operation 509.

The electronic device displays a preview of the first image in operation 511. For example, as illustrated in FIG. 6, the electronic device may display the preview 603 of the first image to which the AWB value of the second image is applied.

In addition, if a monochrome ratio of the first and second images is lower than a reference monochrome ratio, the electronic device may apply an AWB value by considering the first image. In this case, the electronic device may display a preview of the first image to which the AWB value of the first image is applied.

The procedure of FIG. 5 ends.

Figure 7:
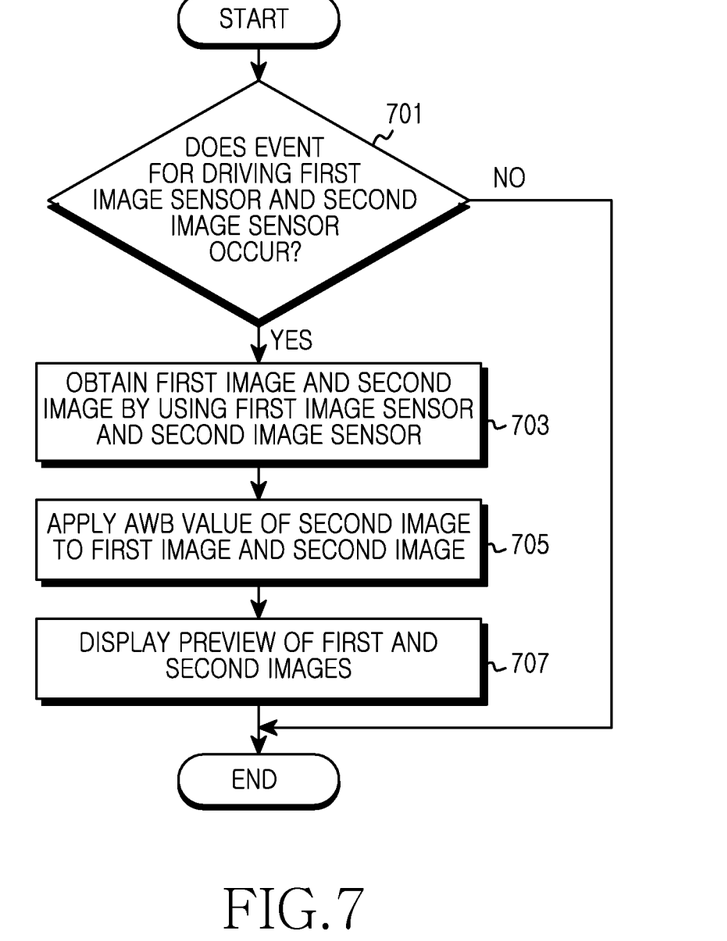
FIG. 7 illustrates a procedure of performing an AWB for an image in an electronic device according to a third embodiment of the present disclosure.

FIG. 7 illustrates a procedure of performing an AWB for an image in an electronic device according to a third embodiment of the present disclosure.

Referring to FIG. 7, the electronic device determines whether an event for driving a first image sensor and a second image sensor occurs in operation 701. For example, as illustrated in FIG. 1, it may be determined whether the first camera 101 located in the front side of the electronic device and the second camera 103 located in the rear side thereof are driven.

If the first image sensor and the second image sensor are driven, the electronic device obtains a first image and a second image from the first image sensor and the second image sensor in operation 703. For example, as illustrated in FIG. 1, the portrait image 105 including the face of the user of the electronic device is obtained from the first camera 101 located in the front side of the electronic device, and the foreground image 107 is obtained from the second camera 103 located in the rear side of the electronic device.

Meanwhile, at operation 701, if the first image sensor and the second image sensor are not driven, the electronic device end processing of the procedure.

After obtaining the first image and the second image, the electronic device applies the AWB value of the second image to the first image and the second image in operation 705.

The electronic device displays a preview of the first and second images in operation 707. For example, as illustrated in FIG. 2, the electronic device may display the preview 205 of the first and second images to which the AWB value of the second image is applied.

The procedure of FIG. 7 ends.

Figure 8:
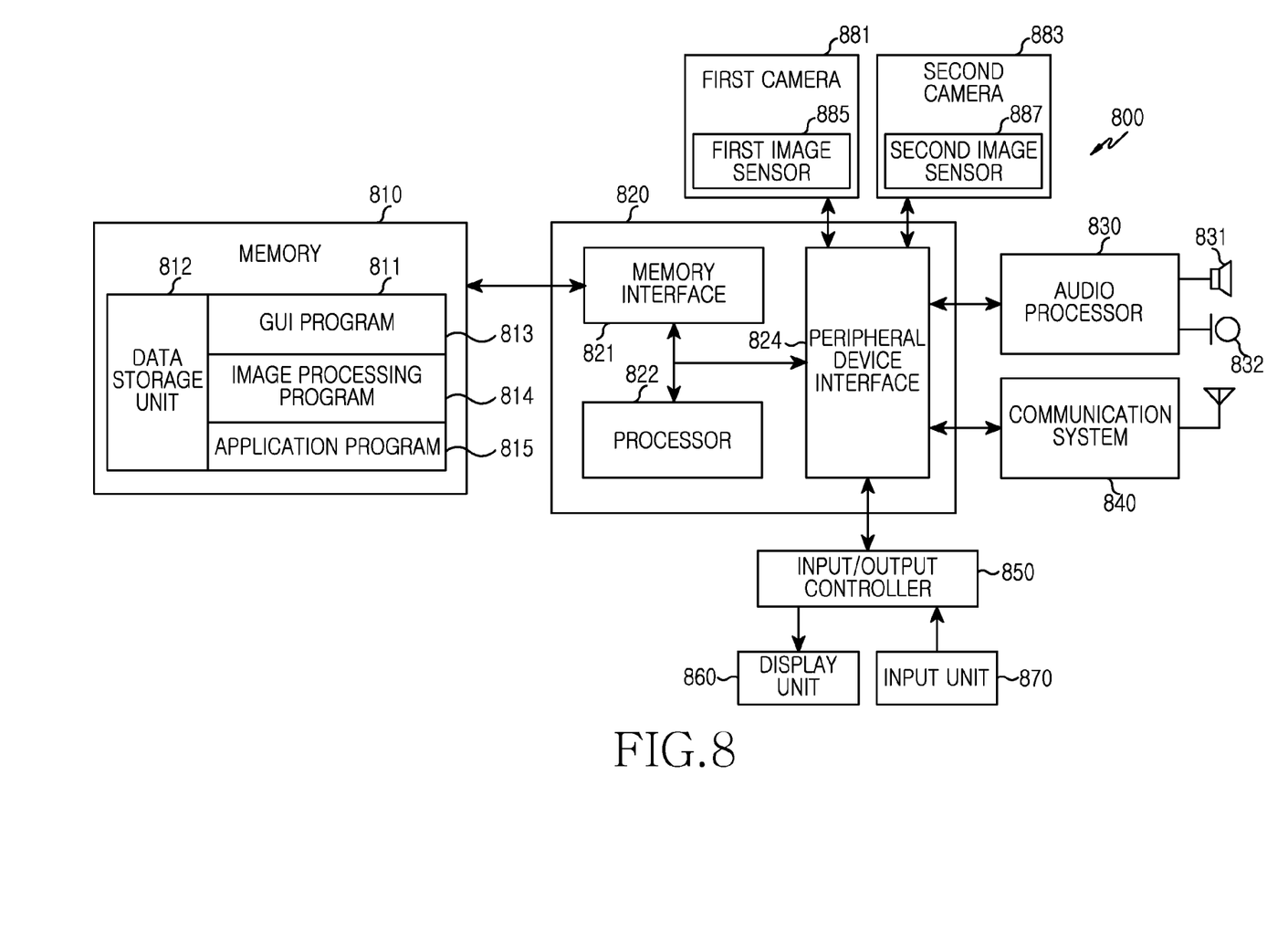
FIG. 8 is a block diagram of an electronic device according to an embodiment of the present disclosure.

FIG. 8 is a block diagram of an electronic device according to an embodiment of the present disclosure.

Referring to FIG. 8, an electronic device 800 includes a memory 810, a processor unit 820, an audio processor 830, a communication system 840, an input/output controller 850, a display unit 860, an input unit 870, a first camera 881, and a second camera 883. Herein, the memory 810 may be plural in number.

Each component will be described below in detail.

The memory 810 includes a program storage unit 811 for storing a program for controlling an operation of the electronic device 800 and a data storage unit 812 for storing data generated during the program is executed.

The program storage unit 811 may include a Graphic User Interface (GUI) program 813, an image processing program 814, and at least one application program 815. Herein, the program included in the program storage unit 811 is a group of instructions, and may be expressed as an instruction set.

The GUI program 813 may include at least one software component for providing a graphic user interface on the display unit 860. For one example, the GUI program 813 may include an instruction for displaying information of an application program driven by the processor 822 in the display unit 860. For another example, the GUI program 813 may include an instruction for displaying at least one subject in the display unit 860 from the processor 822.

The image processing program 814 includes at least one software component for image processing. For example, as illustrated in FIG. 1, the image processing program 814 obtains the portrait image 105 including the face of the user of the electronic device from the first camera 101 located in the front side of the electronic device and the foreground image 107 from the second camera 103 located in the rear side of the electronic device. As illustrated in FIG. 2, the image processing program 814 may detect each monochrome ratio from the portrait image 201 and the foreground image 203 including the face of the user of the electronic device. The image processing program 814 may compare the monochrome ratios to display the preview 205 of the first and second images to which the AWB value of the first image is applied, or may display the preview 205 of the first and second images to which the AWB value of the second image is applied.

The application program 815 includes a software component for at least one application installed in the electronic device 800.

The processor unit 820 includes a memory interface 821, at least one processor 822, and a peripheral device interface 824. Herein, the memory interface 821, the at least one processor 822, and the peripheral device interface 824 included in the processor unit 820 may be integrated as at least one integrated circuit or may be implemented as separate components.

The memory interface 821 controls an access to the memory 810 with respect to a component such as the processor 822 or the peripheral device interface 824.

The peripheral device interface 824 controls a connection of the input/output controller 850, the processor 822, and the memory interface 821 of the electronic device 800.

The processor 822 controls the electronic device 800 to provide various multimedia services by using at least one software program 815. In this case, the processor 822 executes at least one software program 815 stored in the memory 810 to provide a service according to the program.

The audio processor 830 provides an audio interface between the user and the electronic device 800 via a speaker 831 and a microphone 832.

The communication system 840 performs a communication function for voice communication and data communication. In this case, the communication system 840 may be divided into a plurality of communication sub-modules for supporting different communication networks. For example, although not limited thereto, the communication network includes a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, Near Field Communication (NFC), etc.

The input/output controller 850 provides an interface between an input/output unit including the display unit 860 and the input unit 870 and the peripheral device interface 824.

The display unit 860 displays status information of the electronic device 800, a character input by a user, a moving picture, and a still picture. For one example, the display unit 860 may display application information driven by the processor 822 under the control of the GUI program 813. For another example, the display unit 860 may display a preview including at least one subject under the control of the GUI program 813.

The input unit 870 may provide input data generated by a user's selection to the processor unit 820 via the input/output controller 850. In this case, the input unit 870 may include a keypad including at least one hardware button and a touch screen for sensing touch information. For example, the input unit 870 may provide touch information including a touch sensed through the touch screen, a touch movement, and a touch release to the processor 822 via the input/output controller 850.

The first camera 881 obtains a subject from a first image sensor 885.

It is assumed that the second camera 883 has the same structure as the first camera 881 including second image sensor 887.

An image processing unit (not shown) is an Image Signal Processor (ISP), and may convert data (e.g., unprocessed data) output from the first camera 881 and the second camera 883 into image frame (RGB/YUV) data having a pre-set protocol and provide it to the processor 822. In this case, the image processing unit may be included in the first camera 881 and the second camera 883. In addition, the image processing unit may be included in the processor 822.

Figure 9:
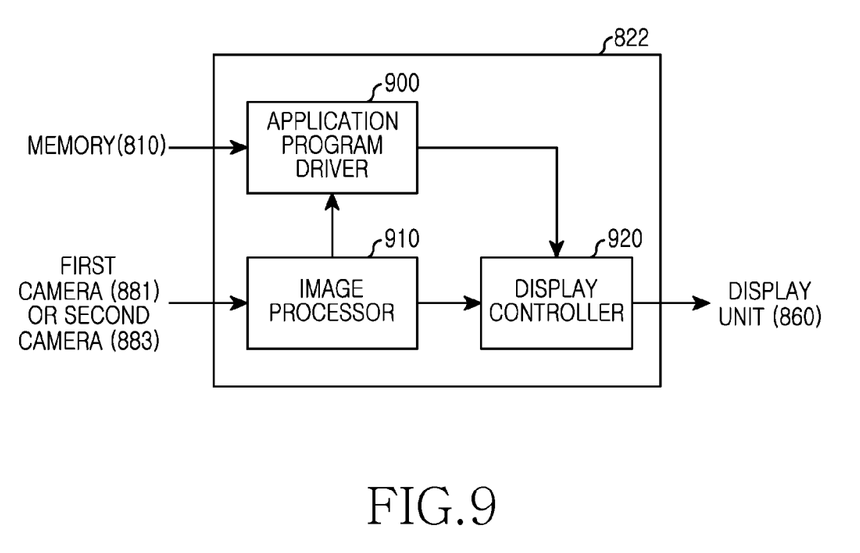
FIG. 9 is a detailed block diagram of a processor according to an embodiment of the present disclosure.

FIG. 9 is a detailed block diagram of a processor according to an embodiment of the present disclosure.

Referring to FIG. 9, the processor 822 includes an application program driver 900, an image processor 910, and a display controller 920.

The application program driver 900 executes at least one application program 815 stored in the program storage unit 811 in memory 810 to provide a service based on the corresponding application. In this case, the application program driver 900 may receive an image obtained from the first camera 881 or the second camera 883 from the image processor 910.

The image processor 910 executes the image processing program 814 stored in the program storage unit 811 to control image processing. For example, as illustrated in FIG. 1, the image processor 910 may obtain the portrait image 105 including the face of the user of the electronic device from the first camera 101 located in the front side of the electronic device and the foreground image 107 from the second camera 103 located in the rear side of the electronic device. As illustrated in FIG. 2, the image processor 910 may detect each monochrome ratio from the portrait image 201 and the foreground image 203 including the face of the user of the electronic device. The image processor 910 may compare the monochrome ratios to display the preview 205 of the first and second images to which the AWB value of the first image is applied, or may display the preview 205 of the first and second images to which the AWB value of the second image is applied.

The display controller 920 executes the GUI program 813 stored in the program storage unit 811 so that the display unit 860 displays a user interface in a graphic manner. For example, the display controller 920 may control the display unit 860 to display information of an application program driven by the processor 822. For another example, the display controller 920 may control the display unit 860 to display at least one object from the image processor 910. For another example, the display controller 920 may include an instruction for displaying at least one subject in the display unit 860 from the image processor 910.

In the aforementioned embodiment, the electronic device 800 controls image processing by using the processor 822 including the image processor 910.

In another embodiment, the electronic device 800 may include an additional image processing module for controlling image processing.

As described above, by sharing an AWB for an image of which color information is widely distributed among images obtained from different cameras in an electronic device having dual cameras, there is an advantage in that the electronic device may effectively perform the AWB even for an image of which color information is narrowly distributed. Because the camera placed in the front side of the mobile electronic device is generally used to capture a user's own face, and thus photographed image obtained from the camera placed in the front side of the mobile device does not include widely distributed color elements for performing the AWB, which may cause an error when the electronic device performs the AWB for the photographed image.

It will be appreciated that various embodiments of the present disclosure according to the claims and description in the specification may be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are various embodiments of machine-readable storage that are suitable for storing a program or programs comprising instructions that, when executed, implement various embodiments of the present disclosure.

Accordingly, various embodiments provide a program comprising code for implementing apparatus or a method as claimed in any one of the claims of this specification and a machine-readable storage storing such a program.

It will be appreciated that various embodiments of the present disclosure according to the claims and description in the specification may be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are various embodiments of machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    obtaining a first image and a second image respectively from a first image sensor and a second image sensor;
    determining, by a processor, a first distribution of color information for the first image and a second distribution of color information for the second image;
    comparing, by the processor, the first distribution of color information and the second distribution of color information;
    processing, by the processor, if the second distribution of color information is wider than the first distribution of color information, the first image by applying an image processing parameter for the second image; and
    generating, by the processor, an image content from the first image which is processed using the image processing parameter for the second image having the second distribution of color information wider than the first distribution of color information,
    wherein the image processing parameter includes an auto white balance (AWB) value.

2. The method of claim 1, wherein the imaging processing parameter further includes at least one of an auto exposure (AE) value, an interpolation value, a color correction value, a gamma correction value, a color space conversion value, and an edge enhancement value.

3. The method of claim 1, further comprising storing, by the processor, at least one of the first image and the second image in memory.

4. A method in an electronic device, the method comprising:
    obtaining, by a processor, three or more images from three or more image sensors;
    determining, by the processor, three or more distributions of color information for the three or more images;
    comparing, by the processor, the three or more distributions of color information;
    determining, by the processor, a widest distribution of color information among the three or more distributions of color information;
    processing, by the processor, the three or more images by applying an image processing parameter for an image corresponding to the widest distribution of color information; and
    generating, by the processor, one or more image contents from the three or more images which are processed using the image processing parameter for the image corresponding to the widest distribution of color information,
    wherein the image processing parameter includes an auto white balance (AWB) value.

5. The method of claim 4, wherein the imaging processing parameter further includes at least one of an auto exposure (AE) value, an interpolation value, a color correction value, a gamma correction value, a color space conversion value, and an edge enhancement value.

6. An electronic device comprising:
    at least one processor;
    at least one memory;
    a display; and
    at least one program stored in the memory and configured to be executable by the at least one processor,
    wherein the processor is configured to:
        obtain a first image and a second image respectively from a first image sensor and a second image sensor,
        determine a first distribution of color information for the first image and a second distribution of color information for a second image,
        compare the first distribution of color information and the second distribution of color information,
        process, if the second distribution of color information is wider than the first distribution of color information, the first image by applying an image processing parameter for the second image, and
        generate an image content from the first image which is processed using the image processing parameter for the second image having the second distribution of color information wider than the first distribution of color information, and
    wherein the image processing parameter includes an auto white balance (AWB) value.

7. The electronic device of claim 6, wherein the imaging processing parameter further includes at least one of an auto exposure (AE) value, an interpolation value, a color correction value, a gamma correction value, a color space conversion value, and an edge enhancement value.

8. The electronic device of claim 6, wherein the processor stores at least one of the first image and the second image in a memory.

9. An electronic device comprising:
    at least one processor;
    at least one memory;
    a display; and at least one program stored in the memory and configured to be executable by the at least one processor, wherein upon execution of the at least one program, the processor:
  obtains three or more images from three or more image sensors,
  determines three or more distributions of color information for the three or more images,
  compares the three or more distributions of color information,
  determines a widest distribution of color information among the three or more distributions of color information, and
  processes the three or more images by applying an image processing parameter for an image corresponding to the widest distribution of color information, and
  generates one or more image contents from the three or more images which are processed using the image processing parameter for the image corresponding to the widest distribution of color information, and
wherein the image processing parameter includes an auto white balance (AWB) value.

10. The electronic device of claim 9, wherein the imaging processing parameter further includes at least one of an auto exposure (AE) value, an interpolation value, a color correction value, a gamma correction value, a color space conversion value, and an edge enhancement value.

* * * * *